A. HORROCKS & E. D. STEVENS.
Roller for Drain-Tile Machines.

No. 199,712. Patented Jan. 29, 1878.

WITNESSES.
Thos. J. Price
Wm. J. Price

INVENTOR
A. Horrocks
E. D. Stevens

UNITED STATES PATENT OFFICE.

ABRAHAM HORROCKS AND EDWARD D. STEVENS, OF BARDOLPH, ILLINOIS.

IMPROVEMENT IN ROLLERS FOR DRAIN-TILE MACHINES.

Specification forming part of Letters Patent No. 199,712, dated January 29, 1878; application filed August 9, 1877.

*To all whom it may concern:*

Be it known that we, ABRAHAM HORROCKS and EDWARD D. STEVENS, of Bardolph, in the county of McDonough and State of Illinois, have invented a new and useful Improvement in Rollers for Brick and Tile Machines; and we do hereby declare that the following is a full, clear, and exact description of the invention, such as will enable others skilled in the art to which it pertains to make and use it, reference being had to the accompanying drawings, and to the letters of reference marked thereon, which form a part of this specification.

Our invention has for its object to improve the construction of rollers used in machines for making brick and drain-tile, so as to prevent the brick or tile from sticking to them; and its novelty consists in constructing a roller with a center-core out of either wood or metal, and covering it with a hard porous substance, such as plaster-of-paris or other similar material, which will form a hard porous body that will absorb a large quantity of water.

To enable others skilled in the art pertaining thereto to make and use our invention, we will now proceed to describe its construction and operation, reference being had to the accompanying drawings, which form a part of this specification, in which—

Figure 1:
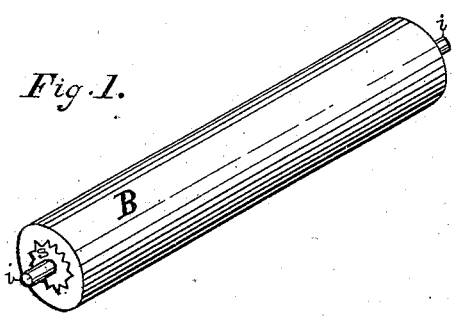
Figure 2:
Figure 3:

Figure 1 represents the roller in perspective. Fig. 2 is a longitudinal section of a roller of different form, which can be made when required. Fig. 3 is a cross-section of Fig. 1.

In constructing these rollers, we prepare a center-core, $s$, of either wood or metal, of sufficient size to give strength to the rollers, and also hold the bearings $i$ $e'$ firmly. These cores can be made either round or square. When made round they should be grooved longitudinally, for the purpose of holding more firmly the porous material $B'$ that is cast around them, and they should be of similar shape as the roller is wanted to be when finished. The cores are placed in a suitable mold, and the material to form the covering is mixed into a plastic state with water and cast around them. The material we use for this purpose is sulphate of lime, (plaster-of-paris,) to which can be added such other ingredients as will have a tendency to give strength, and will not affect its porosity. When the rollers are sufficiently dry, they are placed in a lathe and finished to the desired shape and smoothness.

Operation: A suitable number of the rollers are placed in a frame in the usual manner, which is placed in a proper position in the machine, so that the brick or tile, as they emerge from the machine, are caught on the rollers, which carry them out a sufficient distance to be cut into the proper lengths by the attendant. The rollers, when in use, must be kept damp with water, allowing the porous covering B to absorb all the water that it will once a day. This prevents the brick or tile from sticking to them.

Having thus fully described our invention, what we claim as new, and desire to secure by Letters Patent, is—

A roller for brick or drain-tile machines composed of a center-core, $s$, of either wood or metal, and an outer porous covering, B, of sulphate of lime, (plaster-of-paris,) substantially as described, and for the purpose set forth.

A. HORROCKS.
       E. D. STEVENS.

Witnesses:
 THOS. J. PRICE,
 WM. T. PRICE.